(12) United States Patent
Wang et al.

(10) Patent No.: US 7,960,067 B2
(45) Date of Patent: Jun. 14, 2011

(54) DIRECT OXIDATION FUEL CELL SYSTEMS WITH REGULATED FUEL CONCENTRATION AND OXIDANT FLOW

(75) Inventors: Chao-Yang Wang, State College, PA (US); Masahiro Takada, Shizuoka (JP)

(73) Assignees: Panasonic Corporation, Osaka (JP); Penn State Rsearch Foundation, University Park, PA (US)

( * ) Notice: Subject to any disclaimer, the term of this patent is extended or adjusted under 35 U.S.C. 154(b) by 70 days.

(21) Appl. No.: 12/208,699

(22) Filed: Sep. 11, 2008

(65) Prior Publication Data

US 2009/0011289 A1 Jan. 8, 2009

Related U.S. Application Data

(62) Division of application No. 11/355,249, filed on Feb. 16, 2006, now abandoned.

(51) Int. Cl.
*H01M 8/04* (2006.01)
(52) U.S. Cl. ........ 429/449; 429/443; 429/444; 429/447; 429/448
(58) Field of Classification Search ................... 429/443, 429/444, 447, 448, 449
See application file for complete search history.

(56) References Cited

U.S. PATENT DOCUMENTS

| | | | |
|---|---|---|---|
| 5,599,638 A | 2/1997 | Surampudi et al. | |
| 6,296,964 B1 | 10/2001 | Ren et al. | |
| 6,821,658 B2 | 11/2004 | Acker et al. | |
| 6,824,900 B2 | 11/2004 | DeFilippis | |
| 2002/0119352 A1 | 8/2002 | Baldauf et al. | |
| 2003/0175569 A1 | 9/2003 | Inagaki et al. | |
| 2003/0194589 A1 | 10/2003 | Pratt et al. | |
| 2004/0131898 A1 | 7/2004 | Zhang et al. | |
| 2004/0209136 A1 | 10/2004 | Ren et al. | |
| 2004/0209154 A1 | 10/2004 | Ren et al. | |
| 2004/0265655 A1 | 12/2004 | Kozu et al. | |

(Continued)

FOREIGN PATENT DOCUMENTS

JP   2002-110191   4/2002

(Continued)

OTHER PUBLICATIONS

Lim et al., "Development of high-power electrodes for a liquid-feed direct methanol fuel cell", *Journal Power Sources* 113 (2003) 145-150, 2002 Elsevier Science B.V.

(Continued)

*Primary Examiner* — Gregg Cantelmo
*Assistant Examiner* — Eugenia Wang
(74) *Attorney, Agent, or Firm* — McDermott Will & Emery LLP

(57) ABSTRACT

A direct oxidation fuel cell (DOFC) system, comprises at least one fuel cell assembly including a cathode and an anode with an electrolyte positioned therebetween; a source of liquid fuel in fluid communication with an inlet of the anode; an oxidant supply in fluid communication with an inlet of the cathode; a liquid/gas (L/G) separator in fluid communication with outlets of the anode and cathode for: (1) receiving unreacted fuel and liquid and gaseous products, and (2) supplying a solution of fuel and liquid product to the anode inlet; and a control system for measuring the amount of liquid product and controlling oxidant stoichiometry of the system operation in response to the measured amount of liquid product. Alternatively, the control system controls the concentration of the liquid fuel in the solution supplied to the anode inlet, based upon the system operating temperature or output power.

8 Claims, 3 Drawing Sheets

U.S. PATENT DOCUMENTS

2006/0019143 A1     1/2006     Muramatsu et al.
2007/0054159 A1*    3/2007     Ryoichi et al. .................. 429/13

FOREIGN PATENT DOCUMENTS

| JP | 2002-289200 | | 10/2002 |
|---|---|---|---|
| JP | 2004-247091 | | 9/2004 |
| WO | WO 01/48853 | A1 | 7/2001 |
| WO | WO 2004/032258 | A2 | 4/2004 |
| WO | WO 2004/093231 | A2 | 10/2004 |
| WO | WO 2004088781 | * | 10/2004 |

OTHER PUBLICATIONS

Pasaogullari et al., "Liquid Water Transport in Gas Diffusion Layer of Plymer Electrolyte Fuel Cells", *Journal of The Electrochemical Society*, 151 (3) A399-A406 (2004).

Natarajan et al., "A Two-Dimensional, Two-Phase, Multicomponent, Transient Model for the Cathode of a Proton Exchange Membrane Fuel Cell Using Conventional Gas Distributors", *Journal of the Electrochemical Society*, 148 (12) A1324-A1335 (2001).

Pasaogullari et al.,"Two-phase transport and the role of micro-porous layer in polymer electrolyte fuel cell", *Electrochimica Acta* 49 (2004) 4359-4369, 2004 Elsevier Science Ltd.

International Search Report and written Opinion Of The International Searching Authority Issued in corresponding with International Application No. PCT/US2006/044887, dated on May 29, 2007.

Valdez, T.I., et al. "Development of a 150-Watt Direct Methanol Fuel Cell System", The Fifteenth Annual Battery Conference on Applications and Advances, Jan. 11, 2000, pp. 37-40, USA.

Naryanan S. et al., "Design and Operation of and Electrochemical Methanol Concentration Sensor For Direct Methane Fuel Cell Systems", Mar. 2000, pp. 117-120, vol. 3, No. 3, Electrochemical and Solid-State Letters, IEEE Service Center, USA.

* cited by examiner

DIRECT OXIDATION FUEL CELL SYSTEMS WITH REGULATED FUEL CONCENTRATION AND OXIDANT FLOW

RELATED APPLICATIONS

This application is a Divisional of U.S. application Ser. No. 11/355,249, filed Feb. 16, 2006, now abandoned, the entire contents of each of which are hereby incorporated by reference.

FIELD OF THE INVENTION

The present disclosure relates generally to fuel cells, fuel cell systems, and methods of operating same. More specifically, the present disclosure relates to direct oxidation fuel cells (DOFC's), such as direct methanol fuel cells (DMFC's), and their systems and operating methods.

BACKGROUND OF THE DISCLOSURE

A direct oxidation fuel cell (DOFC) is an electrochemical device that generates electricity from electrochemical oxidation of a liquid fuel. DOFC's do not require a preliminary fuel processing stage; hence, they offer considerable weight and space advantages over indirect fuel cells, i.e., cells requiring preliminary fuel processing. Liquid fuels of interest for use in DOFC's include methanol ($CH_3OH$), formic acid, dimethyl ether (DME), etc., and their aqueous solutions. The oxidant may be substantially pure oxygen ($O_2$) or a dilute stream of oxygen, such as that in air. Significant advantages of employing a DOFC in portable and mobile applications (e.g., notebook computers, mobile phones, PDA's, etc.) include easy storage/handling and high energy density of the liquid fuel.

One example of a DOFC system is a direct methanol fuel cell (DMFC). A DMFC generally employs a membrane-electrode assembly (hereinafter "MEA") having an anode, a cathode, and a proton-conducting membrane electrolyte positioned therebetween. A typical example of a membrane electrolyte is one composed of a perfluorosulfonic acid-tetrafluorethylene copolymer, such as Nafion® (Nafion® is a registered trademark of E.I. Dupont de Nemours and Company). In a DMFC, a methanol/water solution is directly supplied to the anode as the fuel and air is supplied to the cathode as the oxidant. At the anode, the methanol ($CH_3OH$) reacts with the water ($H_2O$) in the presence of a catalyst, typically a Pt or Ru metal-based catalyst, to produce carbon dioxide ($CO_2$), protons ($H^+$ ions), and electrons ($e^-$). The electrochemical reaction is shown as equation (1) below:

$$CH_3OH + H_2O \rightarrow CO_2 + 6H^+ + 6e^- \qquad (1)$$

During operation of the DMFC, the protons migrate to the cathode through the proton-conducting membrane electrolyte, which is non-conductive to electrons. The electrons travel to the cathode through an external circuit for delivery of electrical power to a load device. At the cathode, the protons, electrons, and oxygen ($O_2$) molecules, typically derived from air, are combined to form water. The electrochemical reaction is given in equation (2) below:

$$\tfrac{3}{2}O_2 + 6H^+ + 6e^- \rightarrow 3H_2O \qquad (2)$$

Electrochemical reactions (1) and (2) form an overall cell reaction as shown in equation (3) below:

$$CH_3OH + \tfrac{3}{2}O_2 \rightarrow CO_2 + 2H_2O \qquad (3)$$

One drawback of a conventional DMFC is that the methanol partly permeates the membrane electrolyte from the anode to the cathode, such permeated methanol being termed "crossover methanol". The crossover methanol chemically (i.e., not electrochemically) reacts with oxygen at the cathode, causing a reduction in fuel utilization efficiency and cathode potential, with a corresponding reduction in power generation of the fuel cell. It is thus conventional for DMFC systems to use excessively dilute (3-6% by vol.) methanol solutions for the anode reaction in order to limit methanol crossover and its detrimental consequences. However, the problem with such a DMFC system is that it requires a significant amount of water to be carried in a portable system, thus diminishing the system energy density.

The ability to use highly concentrated fuel is desirable for portable power sources, particularly since DMFC technology is currently competing with advanced batteries, such as those based upon lithium-ion technology. However, even if the fuel cartridge with highly concentrated fuel (e.g., pure or "neat" methanol) carries little to no water, the anodic reaction, i.e., equation (1), still requires one water molecule for each methanol molecule for complete electro-oxidation. Simultaneously, water is produced at the cathode via reduction of oxygen, i.e., equation (2). Therefore, in order to take full advantage of a fuel cell employing highly concentrated fuel, it would be desirable to: (a) maintain a net water balance in the cell where the total water loss from the cell (mainly through the cathode) preferably does not exceed the net production of water (i.e., two water molecules per each methanol molecule consumed according to equation (3)), and (b) transport some of the produced water from the cathode to anode.

Two approaches have been developed to meet the above-mentioned goals in order to directly use concentrated fuel. A first approach is an active water condensing and pumping system to recover cathode water vapor and return it to the anode (U.S. Pat. No. 5,599,638). While this method achieves the goal of carrying concentrated (and even neat) methanol in the fuel cartridge, it suffers from a significant increase in system volume and parasitic power loss due to the need for a bulky condenser and its cooling/pumping accessories.

The second approach is a passive water return technique in which hydraulic pressure at the cathode is generated by including a highly hydrophobic microporous layer (MPL) in the cathode, and this pressure is utilized for driving water from the cathode to the anode through a thin membrane (Ren et al. and Pasaogullari & Wang, *J. Electrochem. Soc.*, pp A399-A406, March 2004). While this passive approach is efficient and does not incur parasitic power loss, the amount of water returned, and hence the concentration of methanol fuel, depends strongly on the cell temperature and power density. Presently, direct use of neat methanol is demonstrated only at or below 40° C. and at low power density (less than 30 $mW/cm^2$). Considerably less concentrated methanol fuel is utilized in high power density (e.g., 60 $mW/cm^2$) systems at elevated temperatures, such as 60° C. In addition, the requirement for thin membranes in this method sacrifices fuel efficiency and operating cell voltage, thus resulting in lower total energy efficiency.

Thus, there is a prevailing need for DOFC/DMFC systems that maintain a balance of water in the fuel cell and return a sufficient amount of water from the cathode to the anode under high-power and elevated temperature operating conditions. There is an additional need for DOFC/DMFC systems that operate with highly concentrated fuel, including neat methanol, and minimize the need for external water supplies or condensation of electrochemically produced water.

A further need exists for DOFC/DMFC systems and operating methods therefor which facilitate operation under various and dynamically changing conditions and scenarios, e.g., as where variable control of the operating (output) current, hence fuel conversion efficiency, is required for matching with dynamically changing requirements of the electrical load.

In view of the foregoing, there exists a need for improved DOFC/DMFC systems and methodologies which facilitate variable (i.e., dynamic) control of the operating parameters of such systems for obtaining optimal performance with very highly concentrated fuel and high power efficiency.

SUMMARY OF THE DISCLOSURE

An advantage of the present disclosure is improved direct oxidation fuel cell (DOFC) systems including control systems adapted for measuring the amount of a product formed during operation and controlling the oxidant stoichiometry in response to the measured amount.

Another advantage of the present disclosure is improved DOFC systems including control systems adapted for controlling the concentration of liquid fuel in a solution supplied to an anode of an electrode assembly of the system.

Still another advantage of the present disclosure is an improved method of operating DOFC systems, including measuring the amount of a product formed during operation and controlling the oxidant stoichiometry in response to the measured amount.

Yet another advantage of the present disclosure is an improved method of operating DOFC systems, including controlling the concentration of liquid fuel in a solution supplied to an anode of an electrode assembly of the system.

Additional advantages and features of the present disclosure will be set forth in the disclosure which follows and in part will become apparent to those having ordinary skill in the art upon examination of the following or may be learned from the practice of the present disclosure. The advantages may be realized and obtained as particularly pointed out in the appended claims.

According to an aspect of the present disclosure, the foregoing and other advantages are achieved in part by an improved direct oxidation fuel cell (DOFC) system, comprising:

(a) at least one fuel cell assembly including a cathode and an anode with an electrolyte positioned therebetween;

(b) a source of liquid fuel in fluid communication with an inlet of the anode;

(c) an oxidant supply in fluid communication with an inlet of the cathode;

(d) a liquid/gas (L/G) separator in fluid communication with outlets of the anode and cathode for: (1) receiving unreacted fuel, liquid product, and gases, and (2) supplying a solution of liquid fuel and liquid product to the inlet of the anode; and (e) a control system for measuring the amount of the liquid product and controlling oxidant stoichiometry of the DOFC system during operation at an appropriate value in response to the measured amount of liquid product.

According to embodiments of the present disclosure, the control system includes a sensor for measuring the amount of liquid product; the sensor measures the amount of the liquid product contained in the L/G separator; the control system is capable of periodically or continuously controlling the oxidant stoichiometry; and the control system comprises an electronic control unit (ECU).

Preferably, the ECU comprises an electronic computer programmed for: (1) comparing the measured amount of liquid product with a predetermined amount for determining whether the measured amount is greater, smaller, or the same as the predetermined amount; (2) determining a calculation factor based upon the comparison; (3) calculating the appropriate value of oxidant stoichiometry utilizing the calculation factor; and (4) regulating the oxidant supply to achieve the appropriate value of oxidant stoichiometry.

Another aspect of the present disclosure is an improved direct oxidation fuel cell (DOFC) system, comprising:

(a) at least one fuel cell assembly including a cathode and an anode with an electrolyte positioned therebetween;

(b) a source of liquid fuel in fluid communication with an inlet of the anode;

(c) an oxidant supply in fluid communication with an inlet of the cathode;

(d) a liquid/gas (L/G) separator for: (1) receiving unreacted fuel, liquid product, and gases from the cathode and anode, and (2) supplying a solution of liquid fuel in liquid product to the inlet of the anode; and (e) a control system adapted for controlling the concentration of the liquid fuel in the solution supplied to the inlet of the anode.

According to the present disclosure, the control system is capable of regulating supply of the liquid fuel to the inlet of the anode from the source of liquid fuel and from the L/G separator; the control system is capable of periodically or continuously controlling the oxidant stoichiometry and comprises an electronic control unit (ECU); and the control system includes a sensor for measuring the operating temperature of the at least one fuel cell assembly.

In accordance with certain embodiments of the present disclosure, the ECU comprises an electronic computer capable of: (1) determining an appropriate concentration of the liquid fuel in the solution supplied to the inlet of the anode based upon the operating temperature of the at least one fuel cell assembly measured by the sensor; and (2) regulating the supply of the liquid fuel to the inlet of the anode from the source of liquid fuel and from the L/G separator to achieve the appropriate concentration; wherein the computer is programmed with a predetermined relationship between the concentration of the liquid fuel supplied to the inlet of the anode and the operating temperature of the at least one fuel cell assembly.

According to other embodiments of the present disclosure, the ECU comprises an electronic computer programmed for: (1) determining an appropriate concentration of the liquid fuel in the solution supplied to the inlet of the anode based upon a desired output power of the at least one fuel cell assembly; and (2) regulating the supply of the liquid fuel to the inlet of the anode from the source of liquid fuel and from the L/G separator to achieve the appropriate concentration; wherein the computer is programmed with a predetermined relationship between the concentration of the liquid fuel supplied to the inlet of the anode and the output power of the at least one fuel cell assembly.

Still another aspect of the present disclosure is an improved method of operating a direct oxidation fuel cell (DOFC) system comprising at least one fuel cell assembly including a cathode and an anode with an electrolyte positioned therebetween, a source of liquid fuel in fluid communication with an inlet of the anode, an oxidant supply in fluid communication with an inlet of the cathode; and a liquid/gas (L/G) separator in fluid communication with outlets of the anode and cathode for: (1) receiving unreacted fuel, liquid product, and gases, and (2) supplying a solution of liquid fuel in liquid product to the inlet of the anode, comprising:

measuring the amount of the liquid product and controlling oxidant stoichiometry of the DOFC system during operation at an appropriate value in response to the measured amount of liquid product.

According to embodiments of the present disclosure, the method comprises utilizing a sensor adapted for measuring the amount of the liquid product contained in the L/G separator, and utilizing an electronic computer programmed for: (1) comparing the measured amount of liquid product with a predetermined amount for determining whether the measured amount is greater, smaller, or the same as the predetermined amount; (2) determining a calculation factor based upon the comparison; (3) calculating the appropriate oxidant stoichiometry utilizing the calculation factor; and (4) regulating the oxidant supply to achieve the appropriate oxidant stoichiometry.

Yet another aspect of the present disclosure is an improved method of operating a direct oxidation fuel cell (DOFC) system comprising at least one fuel cell assembly including a cathode and an anode with an electrolyte positioned therebetween, a source of liquid fuel in fluid communication with an inlet of the anode, an oxidant supply in fluid communication with an inlet of the cathode; and a liquid/gas (L/G) separator in fluid communication with outlets of the anode and cathode for: (1) receiving unreacted fuel, liquid product, and gases, and (2) supplying a solution of liquid fuel in liquid product to the inlet of the anode, comprising:

controlling the concentration of the liquid fuel in the solution supplied to the inlet of the anode.

According to certain embodiments of the disclosure, the method comprises regulating supply of the liquid fuel to the inlet of the anode from the source of liquid fuel and from the L/G separator; wherein the method includes utilizing a sensor for measuring the operating temperature of the at least one fuel cell assembly and an electronic computer programmed for: (1) determining an appropriate concentration of the liquid fuel in the solution supplied to the inlet of the anode based upon the operating temperature of the at least one fuel cell assembly measured by the sensor; and (2) regulating the supply of the liquid fuel to the inlet of the anode from the source of liquid fuel and from the L/G separator to achieve the appropriate concentration. Preferably, a computer is utilized which is programmed with a predetermined relationship between the concentration of the liquid fuel supplied to the inlet of the anode and the operating temperature of the at least one fuel cell assembly.

According to other embodiments of the present disclosure, the method comprises utilizing an electronic computer programmed for: (1) determining an appropriate concentration of the liquid fuel in the solution supplied to the inlet of the anode based upon a desired output power of the at least one fuel cell assembly; and (2) regulating the supply of the liquid fuel to the inlet of the anode from the source of liquid fuel and from the L/G separator to achieve the appropriate concentration. Preferably, a computer is utilized which is programmed with a predetermined relationship between the concentration of the liquid fuel supplied to the inlet of the anode and the output power of the at least one fuel cell assembly.

Additional advantages of the present disclosure will become readily apparent to those skilled in this art from the following detailed description, wherein only the preferred embodiments of the present disclosure are shown and described, simply by way of illustration but not limitation. As will be realized, the disclosure is capable of other and different embodiments, and its several details are capable of modification in various obvious respects, all without departing from the spirit of the present disclosure. Accordingly, the drawings and description are to be regarded as illustrative in nature, and not as restrictive.

BRIEF DESCRIPTION OF THE DRAWINGS

The various features and advantages of the present disclosure will become more apparent and facilitated by reference to the accompanying drawings, provided for purposes of illustration only and not to limit the scope of the invention, wherein the same reference numerals are employed throughout for designating like features and the various features are not necessarily drawn to scale but rather are drawn as to best illustrate the pertinent features, wherein.

DETAILED DESCRIPTION OF THE DISCLOSURE

The present disclosure relates to high power conversion efficiency, dynamically controllable, direct oxidation fuel cells (DOFC) and DOFC systems operating with highly concentrated fuel, e.g., direct methanol fuel cells (DMFC) and systems, and operating methods therefor.

Figure 1:
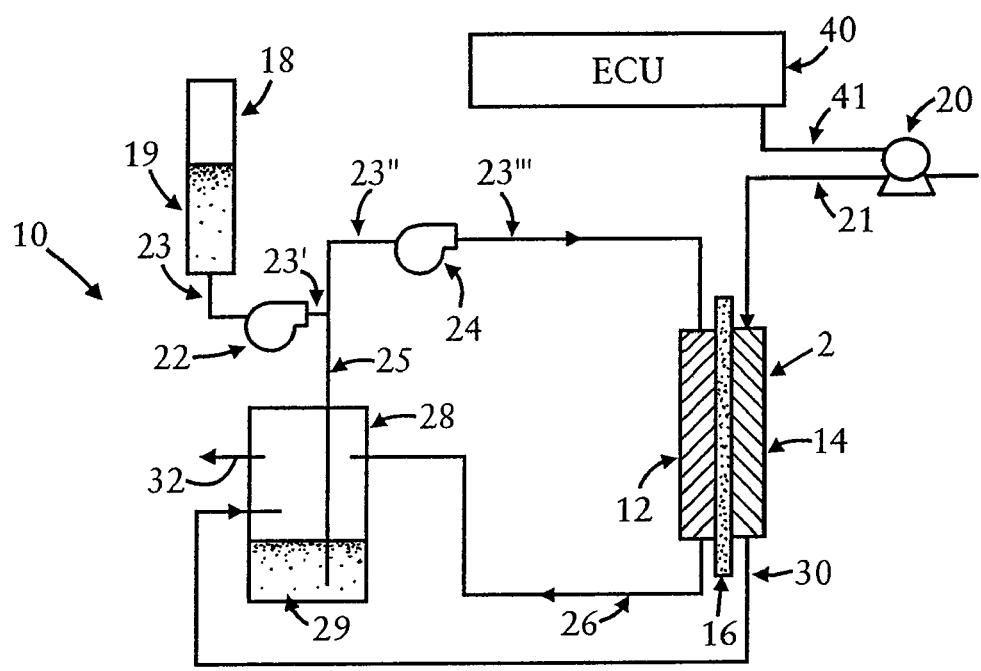
FIG. 1 is a simplified, schematic illustration of a direct oxidation fuel cell (DOFC) system capable of operating with highly concentrated methanol fuel, i.e., a DMFC system.

Referring to FIG. 1, schematically shown therein is an illustrative embodiment of a DOFC system adapted for operating with highly concentrated fuel, e.g., a methanol-based DMFC system 10, which system maintains a balance of water in the fuel cell and returns a sufficient amount of water from the cathode to the anode under high-power and elevated temperature operating conditions. (A DOFC/DMFC system is disclosed in co-pending, commonly assigned U.S. patent application Ser. No. 11/020,306, filed Dec. 27, 2004, now U.S. Pat. No. 7,465,504).

As shown in FIG. 1, DMFC system 10 includes an anode 12, a cathode 14, and a proton-conducting electrolyte membrane 16, forming a multi-layered composite membrane-electrode assembly or structure 2 commonly referred to as an MEA. Typically, a fuel cell system such as DMFC system 10 will have a plurality of such MEAs in the form of a stack; however, FIG. 1 shows only a single MEA for illustrative simplicity. Frequently, the membrane-electrode assemblies 2 are separated by bipolar plates that have serpentine channels for supplying and returning fuel and by-products to and from the assemblies (not shown for illustrative convenience). In a fuel cell stack, MEAs and bipolar plates are aligned in alternating layers to form a stack of cells and the ends of the stack are sandwiched with current collector plates and electrical insulation plates, and the entire unit is secured with fastening structures. Also not shown in FIGS. 1-3, for illustrative simplicity, is a load circuit electrically connected to the anode 12 and cathode 14.

A source of fuel, e.g., a fuel container or cartridge 18 containing a highly concentrated fuel 19 (e.g., methanol), is in fluid communication with anode 12 (as explained below). An oxidant, e.g., air supplied by fan 20 and associated conduit 21, is in fluid communication with cathode 14. The highly concentrated fuel from fuel cartridge 18 is fed directly into liquid/gas ("L/G") separator 28 by pump 22 via associated conduit segments 23' and 25, or directly to anode 12 via pumps 22 and 24 and associated conduit segments 23, 23', 23", and 23'".

In operation, highly concentrated fuel 19 is introduced to the anode side of the MEA 2, or in the case of a cell stack, to an inlet manifold of an anode separator of the stack. Water produced at the cathode 14 side of MEA 2 or cathode cell stack via electrochemical reaction (as expressed by equation (2)) is withdrawn therefrom via cathode outlet or exit port/conduit 30 and supplied to liquid/gas separator 28. Similarly, excess fuel, water, and $CO_2$ gas are withdrawn from the anode side of the MEA 2 or anode cell stack via anode outlet or exit port/conduit 26 and supplied to liquid/gas separator 28. The air or oxygen is introduced to the cathode side of the MEA 2 and regulated to maximize the amount of electrochemically produced water in liquid form while minimizing the amount of electrochemically produced water vapor, thereby minimizing the escape of water vapor from system 10.

During operation of system 10, air is introduced to the cathode 14 (as explained above) and excess air and liquid water are withdrawn therefrom via cathode exit port/conduit 30 and supplied to L/G separator 28. As discussed further below, the input air flow rate or air stoichiometry is controlled to maximize the amount of the liquid phase of the electrochemically produced water while minimizing the amount of the vapor phase of the electrochemically produced water. Control of the oxidant stoichiometry ratio can be obtained by setting the speed of fan 20 at a rate depending on the fuel cell system operating conditions or by an electronic control unit (ECU) 40, e.g., a digital computer-based controller. ECU 40 receives an input signal from a temperature sensor in contact with the liquid phase 29 of L/G separator 28 (not shown in the drawing for illustrative simplicity) and adjusts the oxidant stoichiometric ratio (via line 41 connected to oxidant supply fan 20) so as to maximize the liquid water phase in the cathode exhaust and minimize the water vapor phase in the exhaust, thereby reducing or obviating the need for a water condenser to condense water vapor produced and exhausted from the cathode of the MEA 2. In addition, ECU 40 can increase the oxidant stoichiometry beyond the minimum setting during cold-start in order to avoid excessive water accumulation in the fuel cell.

Liquid water 29 which accumulates in the L/G separator 28 during operation may be returned to anode 12 via circulating pump 24 and conduit segments 25, 23", and 23'". Exhaust carbon dioxide gas is released through port 32 of L/G separator 28.

As indicated above, cathode exhaust water, i.e., water which is electrochemically produced at the cathode during operation, is partitioned into liquid and gas phases, and the relative amounts of water in each phase are controlled mainly by temperature and air flow rate. The amount of liquid water can be maximized and the amount of water vapor minimized by using a sufficiently small oxidant flow rate or oxidant stoichiometry. As a consequence, liquid water from the cathode exhaust can be automatically trapped within the system, i.e., an external condenser is not required, and the liquid water can be combined in sufficient quantity with a highly concentrated fuel, e.g., greater than about 5 molar (M), for use in performing the anodic electrochemical reaction, thereby maximizing the concentration of fuel and storage capacity and minimizing the overall size of the system. The water can be recovered in any suitable existing type of L/G separator 28, e.g., such as those typically used to separate $CO_2$ gas and aqueous methanol solution.

The DOFC system 10 shown in FIG. 1 comprises at least one MEA 2 which includes a polymer electrolyte membrane 16 and a pair of electrodes (an anode 12 and a cathode 14) each composed of a catalyst layer and a gas diffusion layer sandwiching the membrane. Typical polymer electrolyte materials include fluorinated polymers having perfluorosulfonate groups or hydrocarbon polymers such as poly-(arylene ether ether ketone) ("PEEK"). The electrolyte membrane can be of any thickness as, for example, between about 25 and about 180 µm. The catalyst layer typically comprises platinum or ruthenium based metals, or alloys thereof. The anodes and cathodes are typically sandwiched by bipolar separator plates having channels to supply fuel to the anode and an oxidant to the cathode. A fuel cell stack can contain a plurality of such MEA's 2 with at least one electrically conductive separator placed between adjacent MEA's to electrically connect the MEAs in series with each other, and to provide mechanical support.

As has been indicated above, ECU 40 adjusts the oxidant flow rate or stoichiometric ratio so as to maximize the liquid water phase in the cathode exhaust and minimize the water vapor phase in the exhaust, thereby eliminating the need for a water condenser. ECU 40 adjusts the oxidant flow rate, hence stoichiometric ratio, according to a specific equation, illustratively equation (4) given below:

$$\xi_c = \frac{0.42(\gamma + 2)}{3\eta_{fuel}} \frac{p}{p_{sat}} \quad (4)$$

wherein $\xi_c$ is the oxidant stoichiometry, $\gamma$ is the ratio of water to fuel in the fuel supply, $p_{sat}$ is the water vapor saturation pressure corresponding to the cell temperature, p is the cathode operating pressure, and $\eta_{fuel}$ is the fuel efficiency. Such controlled oxidant stoichiometry automatically ensures an appropriate water balance in the DMFC (i.e. enough water for the anode reaction) under any operating conditions. For instance, during start-up of a DMFC system, when the cell temperature increases from e.g., 20° C. to the operating point of 60° C., the corresponding $p_{sat}$ is initially low, and hence a large oxidant stoichiometry (flow rate) should be used in order to avoid excessive water accumulation in the system and therefore cell flooding by liquid water. As the cell temperature increases, the oxidant stoichiometry (e.g., air flow rate) decreases according to equation (4).

In the above, it is assumed that the amount of liquid (e.g., water) produced by electrochemical reaction in MEA 2 and supplied to L/G separator 28 is essentially constant, whereby the amount of liquid product returned to the inlet of anode 12 via pump 24 and conduit segments 25, 23", and 23'" is essentially constant, and is mixed with concentrated liquid fuel 19 from fuel container or cartridge 18 in an appropriate ratio for supplying anode 12 with fuel at an ideal concentration.

However, a number of factors or conditions may result in deviation of system operation from ideal. For example, changes in temperature, load requirement, operating current error, oxidant efficiency change, etc., may incur deviation from ideal operating conditions. In addition, deviation from ideal operation may occur as a result of extended duration of storage of the fuel cell(s) and from vaporization of a portion of the liquid product (e.g., water).

Accordingly, sustained optimal operation of DOFC/DMFC systems at high fuel efficiencies and high power output requires control and/or regulation systems and methodologies for determining and controlling system operating parameters at appropriate levels or values, e.g., fuel supply concentration, in a dynamically changing manner.

Figure 2:
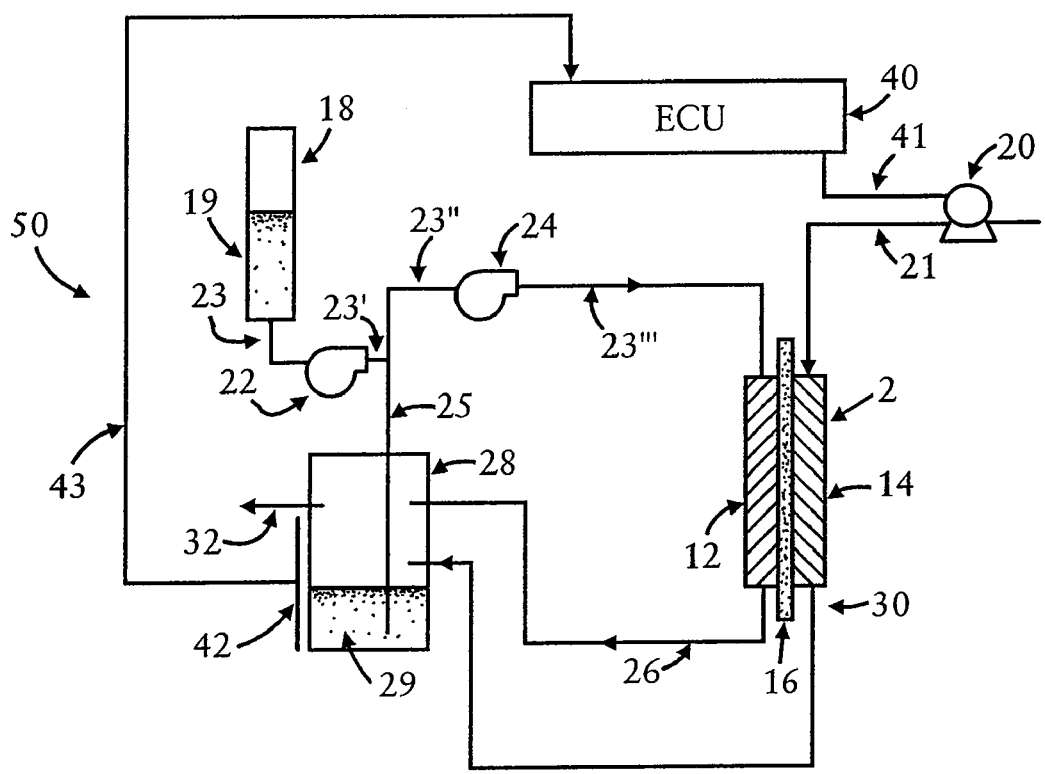
FIG. 2 is a simplified, schematic illustration of a DOFC/DMFC system according to embodiments of the present disclosure.

Referring to FIG. 2, shown therein is a simplified, schematic illustration of a dynamically controllable DOFC/DMFC system 50 according to embodiments of the present disclosure. System 50 is similar to system 10 of FIG. 1, and therefore only those components and features pertaining to the dynamic control aspect of system 50 are described in the following.

As illustrated, system 50 includes a liquid level sensor device 42 adapted for sensing/determining the amount of liquid product (e.g., water) contained in L/G separator 28 at any given instant. While sensor device 42 is shown in the figure as located exteriorly of L/G separator 28, i.e., positioned along an exterior wall thereof, the sensor device 42 is not limited to such placement, and may be located interiorly of the L/G separator 28. Suitable sensor devices 42 for use according to the present disclosure include a variety of conventional liquid level sensing devices, such as, but not limited to, photoelectric devices and float devices. According to the illustrated embodiment, an output signal from the sensor device 42 is supplied as an input to ECU 40 via line 43.

According to these embodiments, equation (4) given above for relating oxidant stoichiometry (i.e., air flow rate to cathode 14 of MEA 2) with ratio of fuel (e.g., methanol) to liquid (e.g., water) in the fuel solution supplied to anode 12 of MEA 2, is modified to include a calculation factor A taking into account deviation of the amount of liquid (e.g., water) product from a predetermined (i.e., expected) value, as follows:

$$\xi_c = \frac{0.42(\gamma + 2)}{3\eta_{fuel}} \frac{p}{p_{sat}} \times A \quad (5)$$

where:

A<1 when the amount of liquid product is lower than the predetermined amount;

A>1 when the amount of liquid product is greater than the predetermined amount; and A=1 when the amount of liquid product is the same as the predetermined amount.

As shown in FIG. 2, DOFC/DMFC system 50 includes a L/G separator 28 in fluid communication (via conduits 26 and 30) with outlets of each of the anode 12 and cathode 14 for: (1) receiving unreacted fuel, liquid product, and gases, and (2) supplying a solution of liquid fuel in liquid product to the inlet of the anode (via conduit segments 25, 23", and 23'" and pumps 22 and 24); and system 50 further includes a control system comprised of sensor device 42 and ECU 40 adapted for measuring the amount of the liquid product formed by the selected electrochemical reactions at the cathode and anode and contained in the L/G separator 28, and controlling oxidant (e.g., air) stoichiometry during operation of system 50 at an appropriate value (via control of fan 20) in response to the measured amount of liquid product.

Preferably, ECU 40 comprises an electronic computer programmed for: (1) comparing the measured amount of liquid product with a predetermined amount of liquid product for determining whether the measured amount is greater than, smaller than, or the same as the predetermined amount; (2) determining a calculation factor based upon the comparison; (3) calculating the appropriate oxidant stoichiometry utilizing equation (5) above including the calculation factor A; and (4) continuously or periodically regulating the oxidant supply (i.e., fan 20 speed) to achieve the appropriate oxidant stoichiometry.

Figure 3:
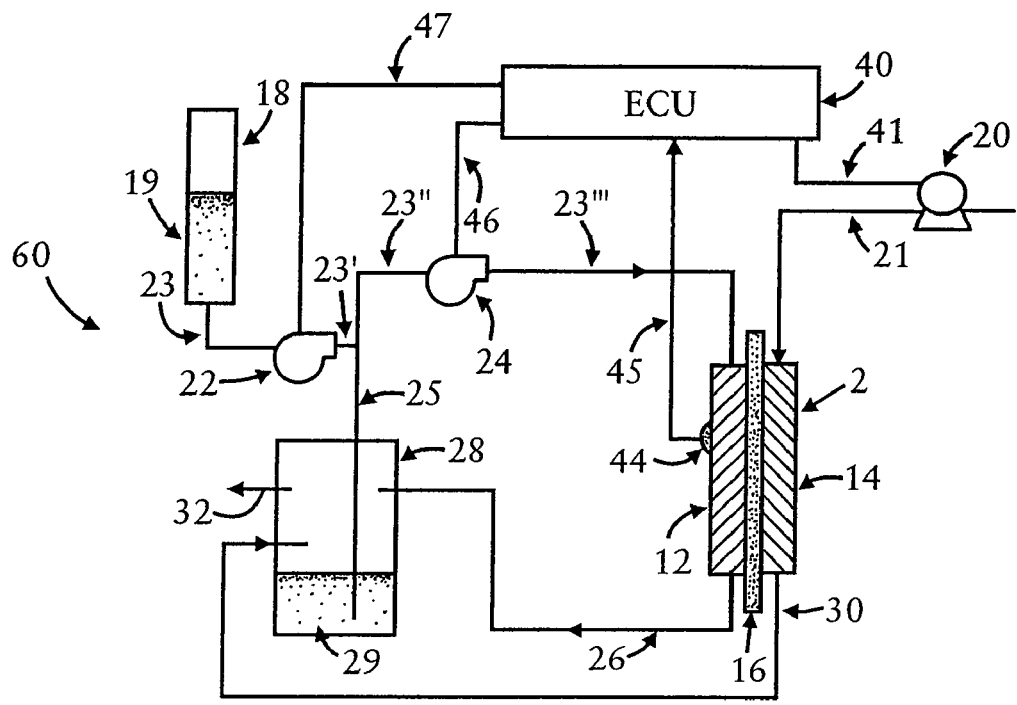
FIG. 3 is a simplified, schematic illustration of a DOFC/DMFC system according to other embodiments of the present disclosure.

Adverting to FIG. 3, shown therein is a simplified, schematic illustration of DOFC/DMFC systems according to further embodiments of the present disclosure. As before, the illustrated systems are similar to system 10 of FIG. 1, and therefore only those components and features pertaining to the dynamic control aspect of the systems are described in the following.

According to certain embodiments of the present disclosure, system 60 includes sensor device 44 for sensing the temperature of MEA 2 and supplying an input signal indicative of the measured temperature to ECU 40 via line 45. System 60 further includes lines 46 and 47 from ECU 40 respectively connected/communicating with circulating pump 24 and concentrated fuel supply pump 22 for regulating the ratio of concentrated fuel to liquid product in the solution or mixture of fuel supplied to the inlet of anode 12 via conduits 23, 23', 23", 23'", and 25.

In accordance with these embodiments, DOFC/DMFC system 60 includes a liquid/gas (L/G) separator 28 in fluid communication (via conduits 26 and 30) with outlets of each of the anode 12 and cathode 14 for: (1) receiving unreacted fuel, liquid product, and gases, and (2) supplying a mixture/solution of the unreacted liquid fuel and liquid product to the inlet of the anode (via conduits 23, 23', 23", 23'", and 25); and system 60 further includes a control system for controlling the concentration of the unreacted liquid fuel in the mixture/solution supplied to the inlet of the anode from the source 18 of concentrated liquid fuel and from the L/G separator 28.

Preferably, ECU 40 comprises an electronic computer programmed for: (1) determining an appropriate concentration of the liquid fuel in the solution supplied to the inlet of the anode based upon the operating temperature of the at least one fuel cell assembly 2 measured by sensor 44; and (2) regulating the supply of the liquid fuel 19 to the inlet of the anode 12 from the source of liquid fuel 18 and from the L/G separator 28 to achieve the appropriate concentration. The computer is programmed with a predetermined relationship between the concentration of the liquid fuel supplied to the inlet of the anode and the operating temperature of the fuel cell assembly.

Figure 4:
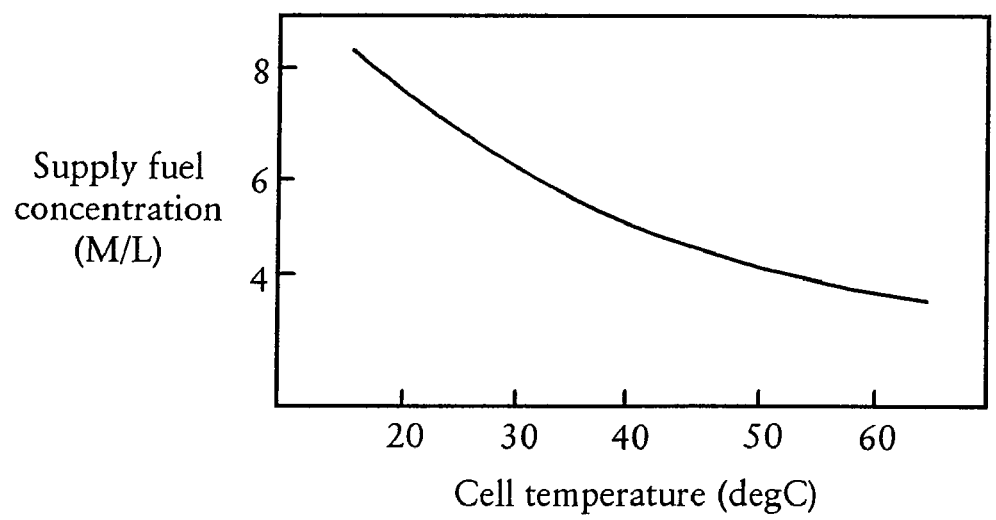
FIG. 4 is a graph for illustrating the variation of the supply fuel concentration of a DOFC/DMFC system according to the present disclosure, as a function of the operating temperature of the system.

Referring to FIG. 4, shown therein is a graph illustrating an example of a predetermined relationship between supply fuel concentration of a DOFC/DMFC system (such as system 60) and operating temperature of the system. As indicated above, ECU 40 is programmed with such predetermined relationship between the concentration of the liquid fuel supplied to the inlet of the anode and the operating temperature of the fuel cell assembly.

According to still another embodiment of the present disclosure, the DOFC/DMFC system does not require measurement of the operating temperature of the MEA 2 for determining an appropriate value of the fuel/liquid product ratio of the fuel mixture/solution supplied to the anode 12 of the MEA. Rather, ECU 40 preferably comprises an electronic computer programmed for: (1) determining an appropriate concentration of the liquid fuel in the solution/mixture supplied to the inlet of the anode based upon a desired (i.e., preselected) output power of the fuel cell assembly; and (2) continuously or periodically regulating the supply of the liquid fuel to the inlet of the anode 12 from the source of liquid fuel 18 and from the L/G separator 28 to achieve the appropriate concentration. The computer is programmed with a predetermined relationship between the concentration of the liquid fuel supplied to the inlet of the anode and the output power density of the fuel cell assembly.

Figure 5:
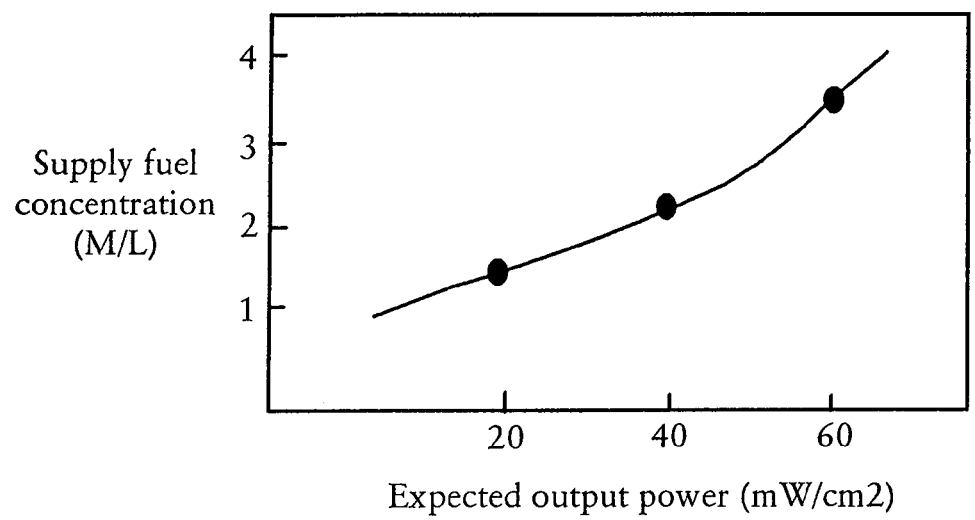
FIG. 5 is a graph for illustrating the variation of the supply fuel concentration of a DOFC/DMFC system according to the present disclosure, as a function of the of the desired output power of the system.

By way of illustration, FIG. 5 is a graph showing an example of a predetermined relationship between the supply fuel concentration and the desired output power density of a DOFC/DMFC system according to the present disclosure. As indicated above, ECU 40 is programmed with such predetermined relationship between the concentration of the liquid fuel supplied to the inlet of the anode and desired output power density of the at least one fuel cell assembly.

Figure 6:
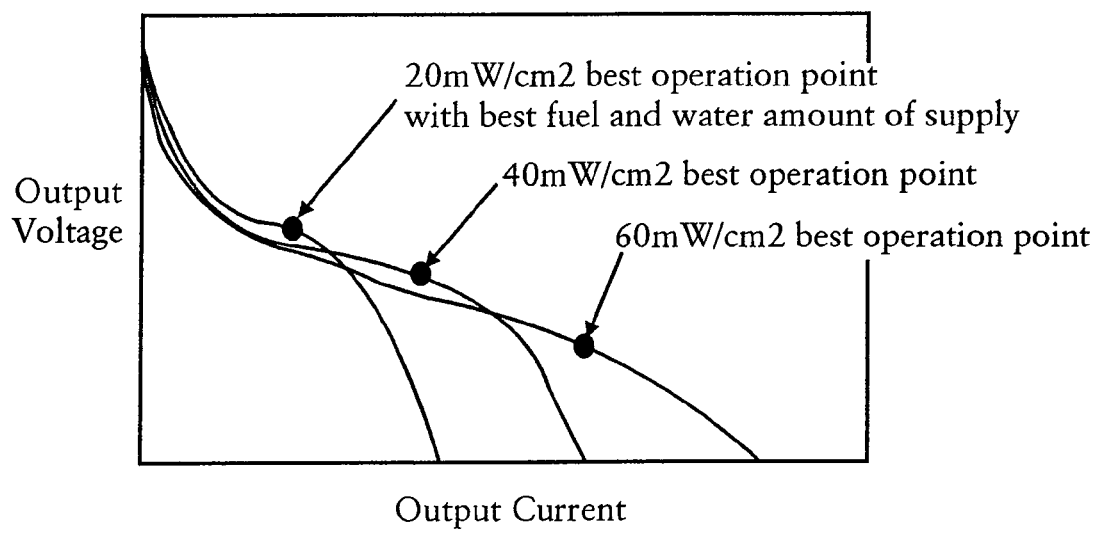
FIG. 6 is a graph for illustrating the variation of the output voltage of a DOFC/DMFC system according to the present disclosure as a function of the output current of the system, for several examples of system output power.

Referring to FIG. 6, shown therein is a graph illustrating the variation of the output voltage of a DOFC/DMFC system according to the present disclosure as a function of the output current of the system, for several examples of system output power density. As is evident from the figure, the optimal operating point with best fuel and liquid (water) supply depends upon the output power density of the DOFC/DMFC system.

In summary, the present disclosure offers a number of advantages in operating DOFC/DMFC systems, including variation of the oxidant (air) stoichiometry in response to deviation of the quantity of produced liquid (water) from an expected (preselected) amount, and variation of the supply fuel concentration in response to changes/deviations in fuel cell operating temperature or output power density from desired (preselected) values.

In the previous description, numerous specific details are set forth, such as specific materials, structures, reactants, processes, etc., in order to provide a better understanding of the present disclosure. However, the present disclosure can be practiced without resorting to the details specifically set forth. In other instances, well-known processing materials and techniques have not been described in detail in order not to unnecessarily obscure the present disclosure.

Only the preferred embodiments of the present disclosure and but a few examples of its versatility are shown and described in the present disclosure. It is to be understood that the present disclosure is capable of use in various other combinations and environments and is susceptible of changes and/or modifications within the scope of the inventive concept as expressed herein.

What is claimed is:

1. A direct oxidation fuel cell (DOFC) system, comprising:
   (a) at least one fuel cell assembly including a cathode and an anode with an electrolyte positioned therebetween;
   (b) a source of liquid fuel in fluid communication with an inlet of said anode;
   (c) an oxidant supply in fluid communication with an inlet of said cathode;
   (d) a liquid/gas (L/G) separator for:
      (1) receiving unreacted fuel, liquid product, and gases from said cathode and anode; and
      (2) supplying a solution of liquid fuel in liquid product to said inlet of said anode; and
   (e) a control system for controlling the concentration of said liquid fuel in said solution supplied to said inlet of said anode,
   wherein:
      said control system is capable of regulating supply of said liquid fuel to said inlet of said anode from said source of liquid fuel and from said L/G separator;
      said control system is capable of periodically or continuously controlling oxidant stoichiometry and comprises an electronic control unit (ECU); and
      said control system includes a sensor for measuring the operating temperature of said at least one fuel cell assembly, and said ECU comprises an electronic computer programmed for:
         (1) determining an appropriate concentration of said liquid fuel in said solution supplied to said inlet of said anode based upon the operating temperature of said at least one fuel cell assembly measured by said sensor;
         (2) regulating said supply of said liquid fuel to said inlet of said anode from said source of liquid fuel and from said L/G separator to achieve said appropriate concentration; and
         (3) controlling said oxidant stoichiometry according to the formula:

$$\xi_c = \frac{0.42(\gamma+2)}{3\eta_{fuel}} \frac{p}{p_{sat}}$$

wherein $\xi_c$ is the oxidant stoichiometry, $\gamma$ is the ratio of water to fuel in the fuel supply, $p_{sat}$ is the water vapor saturation pressure corresponding to the cell temperature, p is the cathode operating pressure, and $\eta_{fuel}$ is the fuel efficiency.

2. The DOFC system as in claim 1, wherein:
said computer is programmed with a predetermined relationship between said concentration of said liquid fuel supplied to said inlet of said anode and said operating temperature of said at least one fuel cell assembly.

3. The DOFC system as in claim 1, wherein:
said electronic computer is further programmed for:
   (1) determining an appropriate concentration of said liquid fuel in said solution supplied to said inlet of said anode based upon a desired output power of said at least one fuel cell assembly; and
   (2) regulating said supply of said liquid fuel to said inlet of said anode from said source of liquid fuel and from said L/G separator to achieve said appropriate concentration.

4. The DOFC system as in claim 3, wherein:
said computer is further programmed with a predetermined relationship between said concentration of said liquid fuel in said solution supplied to said inlet of said anode and said output power of said at least one fuel cell assembly.

5. A method of operating a direct oxidation fuel cell (DOFC) system comprising at least one fuel cell assembly including a cathode and an anode with an electrolyte positioned therebetween; a source of liquid fuel in fluid communication with an inlet of said anode, an oxidant supply in fluid communication with an inlet of said cathode; and a liquid/gas (L/G) separator in fluid communication with outlets of said anode and cathode for:
   (1) receiving unreacted fuel, liquid product, and gases, and
   (2) supplying a solution of liquid fuel in liquid product to said inlet of said anode, comprising:
controlling the concentration of said liquid fuel in said solution supplied to said inlet of said anode,
regulating supply of said liquid fuel to said inlet of said anode from said source of liquid fuel and from said L/G separator,
utilizing a sensor for measuring the operating temperature of said at least one fuel cell assembly and an electronic computer programmed for:
   (1) determining an appropriate concentration of said liquid fuel in said solution supplied to said inlet of said anode based upon the operating temperature of said at least one fuel cell assembly measured by said sensor;

(2) regulating said supply of said liquid fuel to said inlet of said anode from said source of liquid fuel and from said L/G separator to achieve said appropriate concentration; and (3) controlling oxidant stoichiometry according to the formula:

$$\xi_c = \frac{0.42(\gamma + 2)}{3\eta_{fuel}} \frac{p}{p_{sat}}$$

wherein $\xi_c$ is the oxidant stoichiometry, $\gamma$ is the ratio of water to fuel in the fuel supply, $p_{sat}$ is the water vapor saturation pressure corresponding to the cell temperature, p is the cathode operating pressure, and $\eta_{fuel}$ is the fuel efficiency.

6. The method according to claim 5, further comprising:
utilizing said electronic computer,
wherein said electronic computer is programmed with a predetermined relationship between said concentration of said liquid fuel in said solution supplied to said inlet of said anode and said operating temperature of said at least one fuel cell assembly.

7. The method according to claim 5, further comprising:
utilizing said electronic computer programmed for:
(1) determining an appropriate concentration of said liquid fuel in said solution supplied to said inlet of said anode based upon a desired output power of said at least one fuel cell assembly; and
(2) regulating said supply of said liquid fuel to said inlet of said anode from said source of liquid fuel and from said L/G separator to achieve said appropriate concentration.

8. The method according to claim 7, further comprising:
utilizing said electronic computer,
wherein said electronic computer is programmed with a predetermined relationship between said concentration of said liquid fuel in said solution supplied to said inlet of said anode and said output power of said at least one fuel cell assembly.

\* \* \* \* \*